United States Patent [19]

Peer

[11] 3,890,833
[45] June 24, 1975

[54] PRESSURE MEASURING APPARATUS
[75] Inventor: Jon Peer, Stafa, Switzerland
[73] Assignee: Precisa AG, Rechenmaschinenfabrik, Zurich, Switzerland
[22] Filed: Aug. 13, 1973
[21] Appl. No.: 387,663

[30] Foreign Application Priority Data
Aug. 18, 1972  Switzerland...................... 12249/72

[52] U.S. Cl................................ 73/141 A; 177/210
[51] Int. Cl............................ G01g 7/02; G01l 1/14
[58] Field of Search.. 73/141 A, 517 B, 453, 141 R; 177/210, 212, 200, 165, DIG. 5; 336/30; 324/34 PS, 71 R

[56] References Cited
UNITED STATES PATENTS

| 2,675,222 | 4/1954 | Clark | 73/141 R X |
| 2,832,535 | 4/1958 | Sherman | 177/DIG. 5 |
| 3,509,763 | 5/1970 | Tabeling et al. | 73/141 R |
| 3,617,370 | 11/1971 | Myers | 177/DIG. 5 |
| 3,648,793 | 3/1972 | Linville | 73/141 A X |
| 3,685,604 | 8/1972 | Smith et al. | 177/210 X |
| 3,786,883 | 1/1974 | Kunz | 177/212 X |
| 3,799,281 | 3/1974 | Wernitz | 177/210 |

Primary Examiner—Jerry W. Myracle
Assistant Examiner—Stephen A. Kreitman
Attorney, Agent, or Firm—Pierce, Scheffler & Parker

[57] ABSTRACT

Pressure measuring apparatus with electric force compensation has a magnet coil system exerting a counter-force on a pressure sensor. The system has at least two magnet coils which are controllable independently of each other. One magnet coil is for balancing a preliminary load and the second magnet coil is for balancing the force to be determined. The second coil is connected to a control circuit provided with a system for sensing the position of the sensor and a system for sensing the current required to balance the preliminary load. Once the preliminary force is balanced by one coil further applied force is measured by the current in the other coil.

8 Claims, 2 Drawing Figures

PRESSURE MEASURING APPARATUS

BACKGROUND OF THE INVENTION

1. FIELD OF THE INVENTION

The invention relates to a measuring apparatus.

2. DESCRIPTION OF THE PRIOR ART

The pressure measuring apparatuses with electric force compensation which are already known generally have the disadvantage that both the electric current necessary for the compensation, and a correction current which is necessary for allowing for a preliminary load, formed for example by a receiving vessel, flow through the same electromagnetic coils. The measuring range of the apparatus is reduced by the correction valve, which is particularly disadvantageous when using receiving vessels which are relatively heavy in proportion to the measuring range.

SUMMARY

The object of the invention is to provide measuring apparatus which does not have these disadvantages.

The measuring apparatus according to the invention is characterized in that the magnet coil system exerting a counter-force on the pressure sensor has at least two magnet coils which are mounted fixed relative to each other so as to move together as a unit relative to the magnet structure which is, specifically, a permanent magnet but are controllable electrically independently of each other, wherein one magnet coil for adjusting a preliminary load is connected to a first controllable circuit and the second magnet coil for setting the force to be determined is connected to a second controllable circuit provided with an arrangement scanning the position of the pressure sensor and a measuring device which is calibrated in force units and measures the currents flowing through.

In order that the electro-magnet system may be kept as small as possible it is expedient it if is connected to the sensor by a lever arm.

It is advantageous if the system for sensing the position of the sensor is a photoelectric system.

In order to obtain a parallel guide of the sensor which is free of friction as far as possible, it is expedient if the sensor is supported by a parallel motion linkage and the electro-magnet system is connected to the sensor by a lever part of which forms one link of the linkage.

DESCRIPTION OF PREFERRED EMBODIMENTS

Figure 1:
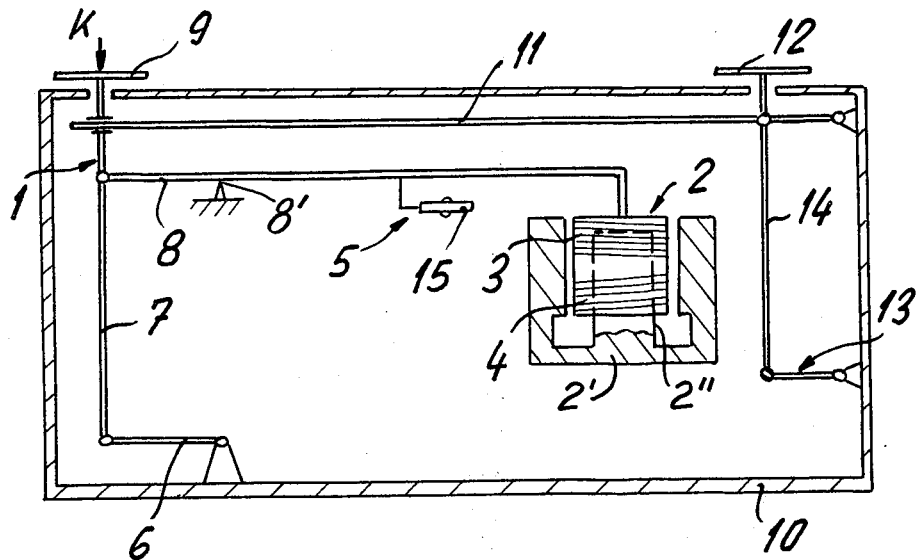
FIG. 1 is a longitudinal sectional view through an embodiment of a pressure measuring apparatus according to the invention.

An electro-magnet system 2 exerting a counter-force on a pressure sensor 1 is comprised of a permanent magnet structure 2' including a central core 2" on which are disposed two coils 3 and 4 the respective energizations of which are controlled independently. One magnet coil 3 is for balancing a preliminary load and the second magnet coil 4 is connected to a circuit for setting the force to be determined. The two coils 3 and 4 are supported for movement as a unit on the central core 2" to an extent dependent upon their respective energizations. This circuit is provided with a photoelectric arrangement 5 for scanning the position of the sensor 1.

The pressure sensor 1 is supported on a parallel motion linkage formed by links 6 and 7 and one arm of a lever 8, the other arm of which has its free end attached to the movable dual coil structure 3-4 so that as lever 8 is initially deflected counterclockwise about the fulcrum 8' the dual coil structure moves in the upward direction on core 2". As will be explained below, this initially upward movement of the dual coil structure 3-4 results in an energization of the coil structure and the magnetic field which is thus produced reacts with the magnetic field produced by the permanent magnet 2' in such manner as to cause the dual coil structure to be moved in the downward direction on core 2" until it reaches its original position thus restoring lever 8 to its original position. The use of a lever permits a small electromagnet to be used.

In order that the measuring apparatus can be used in all orientations the parallelogram linkage is compensated by an arrangement of counter-weights (not shown).

The electromagnet system 2 is designed so that a maximum of 200 grammes can be measured on the bearing plate 9 which is firmly connected to the pressure sensor 1. The pressure sensor 1 is connected to a second bearing plate 12 by one arm of a lever 11, the free end of the other arm of which is pivotally connected to the apparatus housing 10. The other arm of the lever 11 forms a second parallelogram linkage with links 13 and 14 supporting the bearing plate 12. This second parallelogram system is also compensated by means of counter-weights (not shown) and its operation is independent of the position of the apparatus. If the reduction ratio of the lever 11 is 10 : 1 then a weight of 2 kg can be measured with the same electromagnet system 2.

If a force K acts on the bearing plate 9, the lever arm 8 and thus a shutter 15 of the photoelectric scanning arrangement 5 are deflected in a counter-clockwise direction thus resulting in an upward movement of the dual coil structure 3-4 on magnet core 2".

Figure 2:
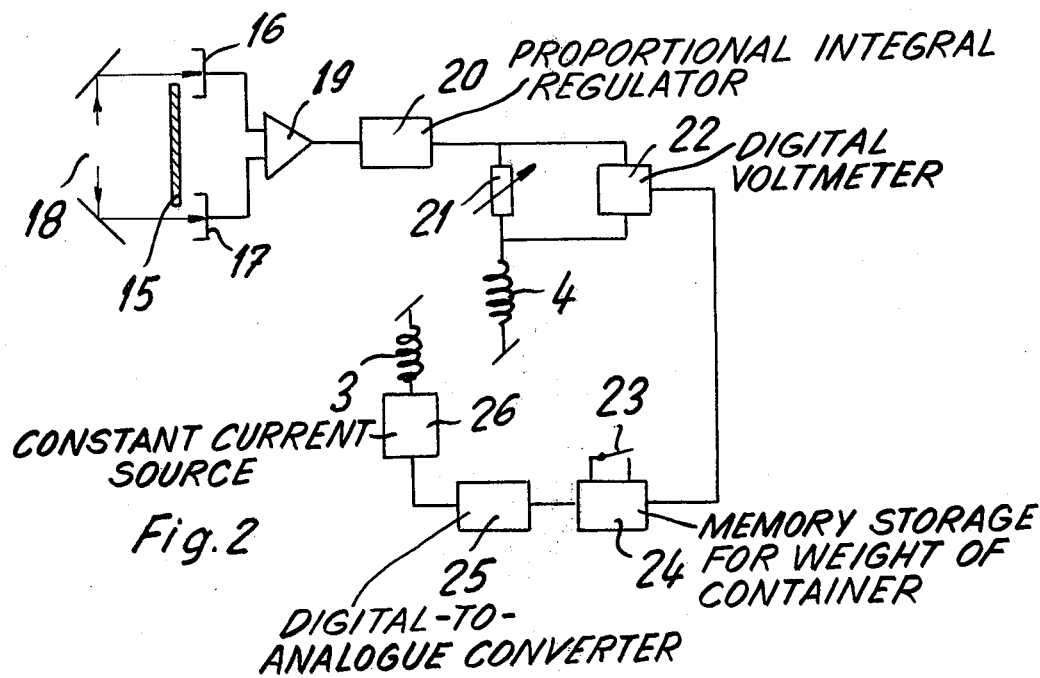
FIG. 2 is a circuit diagram of the measuring apparatus illustrated in FIG. 1.

As shown in FIG. 2, this results in phototransistors 16 and 17 being illuminated to different degrees by a lamp 18 and causing a voltage to appear at the input of a proportional integral regulator 20 by means of a differential amplifier 19. The regulator 20 then causes a current to flow through a variable resistor 21 and the coil 4. This energization of coil 4 causes the dual coil structure 3-4 to be drawn down on the magnet core 2" and results in a deflection of the lever 8 and the shutter 15 in the opposite sense until the shutter 15 is again symmetrically located with respect to phototransistors 16 and 17 and at which time the dual coil structure 3-4 will have been restored to its initial starting position.

Since the current $I_1$ flowing through the coil 4 at this time is proportional to the force acting on the bearing plate 9, the force can be read off from a digital voltmeter 22 connected across the resistor 21. The circuit is calibrated with the aid of the variable resistance 21.

The voltage measured by the digital voltmeter 22 appears at its ouput as a binary coded digital value. If the force K caused by a containing vessel is not to be included in the measurements but only that due to the material cast into the vessel, then by means of a switch 23 a memory 24 is caused to store the binary coded digital value corresponding to the container. A digital-toanalogue converter 25 connected to the memory 24 converts the binary coded value into an analogue voltage which is supplied to a constant current circuit 26 which supplies a constant current which is independent of the load and is proportional to the analogue voltage. This current passes through the coil 3 which provides the electromagnetic force originally provided by the magnet coil 4, the current in which becomes zero. The container is thus balanced by the coil 3 and the entire working range of the coil 4 is once more available for measuring the weight of the container contents.

The measuring apparatus can be used for measuring the density of moisture absorption or the weight of articles, thread tension, or spring force, for example.

I claim:

1. Measuring apparatus comprising:
   a force sensing unit mounted for movement in response to a force to be measured and having a rest position from which it is displaced to an extent dependent upon the magnitude of said force;
   a magnetic structure comprising a permanent magnet component including a core portion and a composite coil component comprising first and second separately energizable coils mounted on said core portion for displacement relative thereto, one of said components being stationary and the other component being movable and interconnected with said force sensing unit for balancing a force applied thereto;
   means for sensing an initial displacement of said force sensing unit from its rest position and providing a corresponding output current in said first coil which produces a corresponding counter balancing electromagnetic force that restores said force sensing unit to its rest position; and
   means for sensing the current in said first coil and maintaining an output current in said second coil to hold said force sensing unit in its rest position, the force applied to said force sensing unit being now balanced by the electromagnetic force produced by said second coil so that the current in said first coil drops to zero, whereby subsequent forces applied to said force sensing unit are balanced by an electromagnetic force produced by said first coil and measured relative to the initially applied force by the current in said first coil.

2. Apparatus as set forth in claim 1, including a first order lever having one end pivotally connected to said magnetic structure and the other end pivotally connected to said force sensing unit, said first order lever being pivoted to a fixed point in said apparatus.

3. Apparatus as set forth in claim 2, including a parallel-motion linkage supporting said force sensing unit, one link of which is formed by one arm of said first order lever.

4. Apparatus as set forth in claim 1, including a lever having one end pivoted to a fixed point in the apparatus, the other end pivotally connected to said force sensing unit, and an intermediate point pivotally connected to a further force sensing unit acted on by large forces to be measured.

5. Apparatus as set forth in claim 4, including a parallel-motion linkage supporting said further force sensing unit, one link of which is formed by one arm of said lever.

6. Apparatus as set forth in claim 1 in which said means for sensing initial displacement of said force sensing unit is a photo-electric system.

7. Apparatus as set forth in claim 6, in which said means for sensing initial displacement of said force sensing unit includes a shutter linked to said force sensing unit, a light source, two photo-sensitive elements, a comparator connected to receive the outputs of said photo-sensitive elements and providing an output indicative of the difference therebetween, said means for sensing initial displacement of said force sensing unit being so adjusted that when said force sensing unit is in said rest position no output is produced by said comparator, an output from said comparator thus indicating displacement of said force sensing unit.

8. Apparatus as set forth in claim 1 in which said means for sensing the current in said first coil and maintaining an output current in said second coil includes a resistance in series with said first coil, a circuit measuring the voltage across said resistance and providing a coded signal significant of said current, a memory holding said coded signal, and a current source controlled by said memory and maintaining said output current in said second coil.

* * * * *